United States Patent
Gagas et al.

(10) Patent No.: US 10,541,614 B1
(45) Date of Patent: Jan. 21, 2020

(54) METHOD AND APPARATUS FOR CONTROLLING A DC/DC POWER CONVERTER

(71) Applicant: GM Global Technology Operations LLC, Detroit, MI (US)

(72) Inventors: Brent S. Gagas, Ferndale, MI (US); Brian A. Welchko, Oakland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/406,598

(22) Filed: May 8, 2019

(51) Int. Cl.
*H02M 3/158* (2006.01)
*G05F 1/10* (2006.01)

(52) U.S. Cl.
CPC ............ *H02M 3/1582* (2013.01); *G05F 1/10* (2013.01)

(58) Field of Classification Search
CPC .............................. H02M 3/1582; G05F 1/10
See application file for complete search history.

(56) References Cited

U.S. PATENT DOCUMENTS 5,477,132 A * 12/1995 Canter .................. B64G 1/428
320/101

* cited by examiner

*Primary Examiner* — Adolf D Berhane
*Assistant Examiner* — Afework S Demisse
(74) *Attorney, Agent, or Firm* — Quinn IP Law

(57) ABSTRACT

A DC-DC power converter is described, and includes switched inductance circuits arranged in parallel, current sensors disposed to monitor one of the switched inductance circuits, and a controller. The DC-DC power converter supplies electric power originating from a DC power source to a high-voltage bus. Control and operation includes determining a desired control mode for operating the DC-DC power converter, wherein the desired control mode includes one of a voltage control mode and a current control mode. A desired voltage and a desired differential current for operating the DC-DC power converter are determined based upon the desired control mode. A desired current for operating the DC-DC power converter is determined based upon the desired differential current. Operation of the DC-DC power converter is controlled in the desired control mode based upon the desired voltage and the desired current.

20 Claims, 7 Drawing Sheets

METHOD AND APPARATUS FOR CONTROLLING A DC/DC POWER CONVERTER

INTRODUCTION

Multi-phase direct current-to-direct current (DC-DC) power converters, such as boost converters, operate to increase or boost an input voltage level to an elevated output voltage level employing multiple phases. The input voltage may originate from a DC power source, and the output voltage may be supplied to a high-voltage electric power bus. Such DC-DC converters may be employed to supply electric power to electric motors for efficient operation of an inverter and an electric motor. Also, such DC-DC power converters can be used between multiple power storage devices to match the voltages thereof.

A DC-DC power converter may be employed in a system that supplies high-voltage electric power from a DC power source, e.g., a fuel cell, to a high-voltage electric bus to power an electric machine such as a torque motor. Operation of a DC-DC power converter may include operating in a current control mode or operating in a voltage control mode, and dynamically transitioning between the modes during operation. It is desirable to have a smooth transition between operation in a current control mode and a voltage control mode, including under conditions of limit operations, e.g., at a maximum current state or a maximum voltage state. It is also desirable to transition between current and voltage control modes via selectable or automatic action when operating at limit conditions. Other desirable features and characteristics of the present disclosure will become apparent from the subsequent detailed description and the appended claims, taken in conjunction with the accompanying drawings and the foregoing technical field and background.

SUMMARY

A DC-DC power converter is described, and includes a plurality of switched inductance circuits arranged in parallel, a plurality of current sensors, each disposed to monitor one of the switched inductance circuits, and a controller. The DC-DC power converter may be arranged to supply electric power originating from a DC power source to a high-voltage bus. Control and operation of the DC-DC power converter includes determining a desired control mode for operating the DC-DC power converter, wherein the desired control mode includes one of a voltage control mode and a current control mode. A desired voltage and a desired differential current for operating the DC-DC power converter are determined based upon the desired control mode. A desired current for operating the DC-DC power converter is determined based upon the desired differential current. Operation of the DC-DC power converter is controlled in the desired control mode based upon the desired voltage and the desired current.

An aspect of the disclosure includes setting the desired voltage equal to a feedback voltage when the desired control mode is the current control mode.

Another aspect of the disclosure includes executing a voltage command state filter to determine the desired voltage when the desired control mode is the voltage control mode.

Another aspect of the disclosure includes the desired voltage being subjected to a minimum saturation limit and a maximum saturation limit.

Another aspect of the disclosure includes determining the desired differential current for operating the DC-DC power converter based upon the desired control mode by determining a first desired differential current based upon a difference between the desired voltage and a monitored voltage when the desired control mode is the voltage control mode.

Another aspect of the disclosure includes executing an anti-windup function to control the first desired differential current when the first desired differential current approaches a saturation limit.

Another aspect of the disclosure includes integrating the first desired differential current to determine the desired current when the voltage control mode is the desired control mode.

Another aspect of the disclosure includes determining a desired differential current for operating the DC-DC power converter based upon the desired control mode, including determining a second desired differential current based upon a difference between the desired current and a monitored current when the current control mode is the desired control mode.

Another aspect of the disclosure includes integrating the second desired differential current to determine the desired current when the desired control mode is the current control mode and when the desired voltage has not reached either a maximum saturation limit or a minimum saturation limit.

Another aspect of the disclosure includes determining a first desired differential current based upon a difference between the desired voltage and a monitored voltage, selecting a maximum of the first desired differential current and the second desired differential current, and integrating the maximum of the first and second desired differential currents to determine the desired current when the current control mode is the desired control mode and when the desired voltage has reached the maximum saturation limit.

Another aspect of the disclosure includes determining a first desired differential current based upon a difference between the desired voltage and a monitored voltage, selecting a minimum of the first desired differential current and the second desired differential current, and integrating the minimum of the first and second desired differential currents to determine the desired current when the current control mode is the desired control mode and when the desired voltage has reached the minimum saturation limit.

Another aspect of the disclosure includes a DC-DC power converter arranged to supply electric power originating from a DC power source to a high-voltage bus that includes a plurality of interleaved switched inductance circuits, a bulk capacitor, and a HWIO ("hardware input/output") circuit including a gate driver circuit and an electrical interface circuit. Each of the interleaved switched inductance circuits includes an inductor, a diode and a power semiconductor switch, and a current sensor, the DC-DC power converter is operated at a fixed frequency with a preset cycle time, and the plurality of switched inductance circuits are operated with offsets in phase during each cycle period. A controller is in communication with the HWIO circuit and includes a memory device including an instruction set that is executable to determine a desired control mode for operating the DC-DC power converter, wherein the desired control mode comprises one of a voltage control mode and a current control mode, determine a desired voltage for operating the DC-DC power converter based upon the desired control mode, determine a desired differential current for operating the DC-DC power converter based upon the desired control mode, determine a desired current for operating the DC-DC power converter based upon the desired differential current and the desired voltage, and control operation of the DC-DC power converter in the desired control mode based upon the desired voltage and the desired current.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. Furthermore, the disclosure, as illustrated and described herein, may be practiced in the absence of an element that is not specifically disclosed herein.

Figure 1:
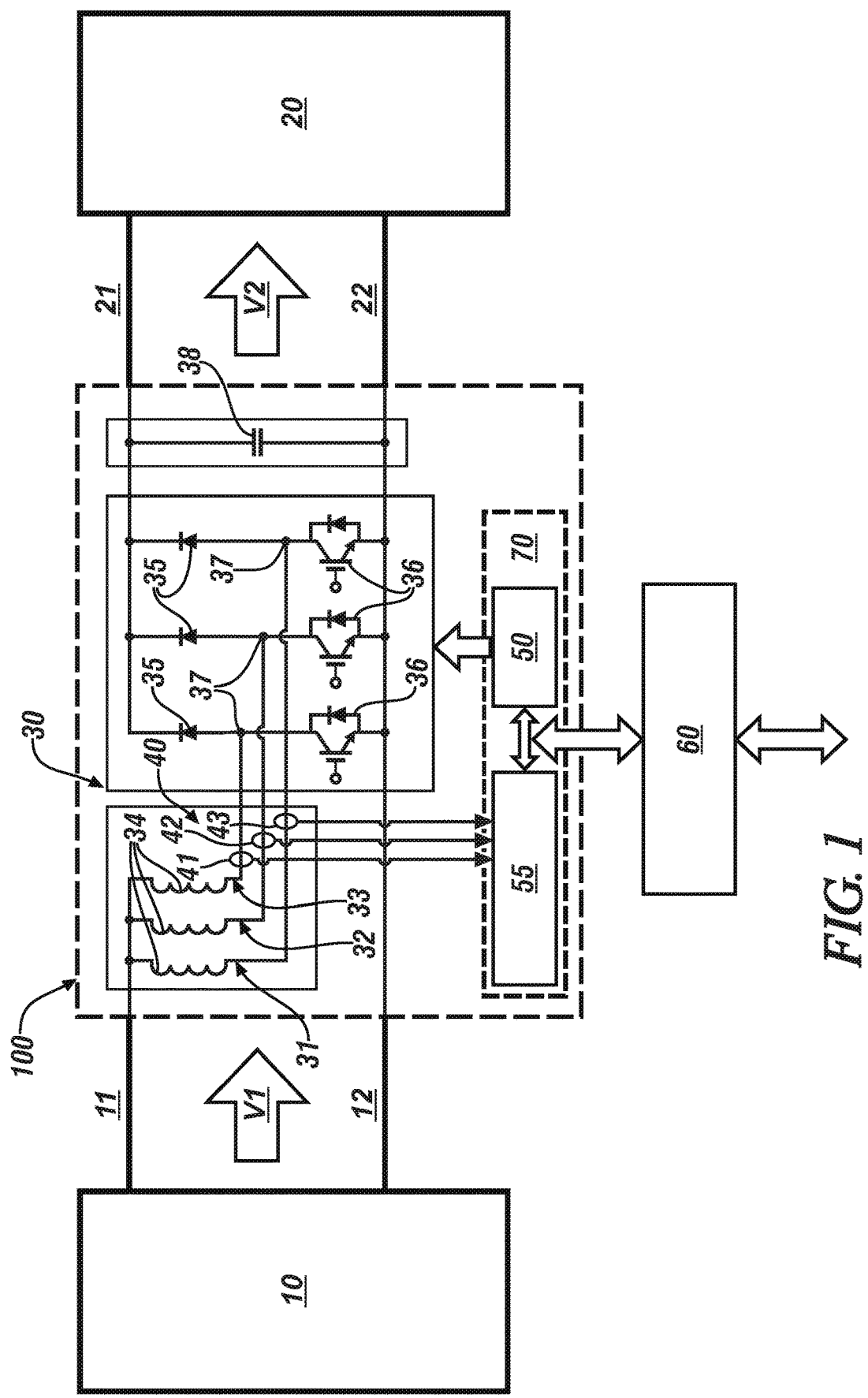
FIG. 1 schematic illustrates a multi-phase interleaved DC-DC power converter that is arranged to conduct electric power from a DC power source to a high-voltage electrical bus, in accordance with the disclosure.

Referring to the drawings, wherein like reference numerals correspond to like or similar components throughout the several Figures, FIG. 1, consistent with embodiments disclosed herein, illustrates a multi-phase interleaved DC-DC power converter 100 ('DC-DC power converter 100') that is arranged to conduct electric power from a DC power source 10 to a high-voltage electrical bus 20. The DC power source 10 supplies DC electric power at a first voltage level (V1) to an input bus that includes a positive input bus link (HV1+) 11 and a negative input bus link (HV1−) 12. The DC-DC power converter 100 converts the supplied DC electric power to electric power having a second voltage level (V2), which is supplied to the high-voltage electrical bus 20 via a positive output bus link (HV2+) 21 and a negative output bus link (HV2−) 22. The second voltage level (V2) is greater than the first voltage level (V1) in one embodiment. In one embodiment, and as shown the negative input bus link (HV1−) 12 and the negative output bus link (HV2−) 22 are electrically connected.

In one embodiment, the DC power source 10 is a fuel cell that is disposed on-vehicle, and the high-voltage electrical bus 20 is arranged to supply electrical power to one or more electrical machines, such as a traction motor, an accessory motor, etc. Alternatively, the DC power source 10 may be another electric power source, such as a capacitor, a battery, etc. The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. In addition, the concepts described herein may be applied to a system in which an embodiment of the DC power source 10 and DC-DC power converter 100 are arranged to supply electrical power to one or more stationary electric machines, such as a generator.

The DC-DC power converter 100 includes a plurality of interleaved switched inductance circuits 30, a bulk capacitor 38, and HWIO ("hardware input/output") 70, which includes software drivers and corresponding controller hardware, a plurality of sensors 40, a gate driver circuit 50 and an electrical interface circuit 55. The HWIO 70 includes a low-level interface and software. The plurality of interleaved switched inductance circuits 30 include, in one embodiment, a first switched inductance circuit 31, a second switched inductance circuit 32, and a third switched inductance circuit 33. Each of the first, second and third switched inductance circuits 31, 32, and 33 includes an inductor 34, a diode 35 and a power semiconductor switch 36, including one of the inductors 34 being electrically connected to a node 37 that electrically connects one of the diodes 35 and one of the power switches 36. The respective inductor 34 is arranged between HV1+ 11 and the node 37, and the respective diode 35 is arranged in series with the respective power semiconductor switch 36 between HV2+ 21 and VH2− 22. One of the inductors 34 is arranged between HV1+ 11 and the junction of the respective diode 35 in series with the respective power semiconductor switch 36. The plurality of sensors 40 includes current sensors 41, 42, 43, which are arranged to monitor phase currents passing through the respective node 37 of the respective first, second and third switched inductance circuits 31, 32, and 33. The DC-DC power converter 100 is operated at a fixed frequency with a preset cycle time, and the first, second and third switched inductance circuits 31, 32, and 33 are operated with offsets in phase during each cycle period. The configuration of the inductor 34, diode 35 and controlled activation and deactivation of the power semiconductor switch 36 facilitates generating an output voltage that is greater than the input voltage.

Figure 2:
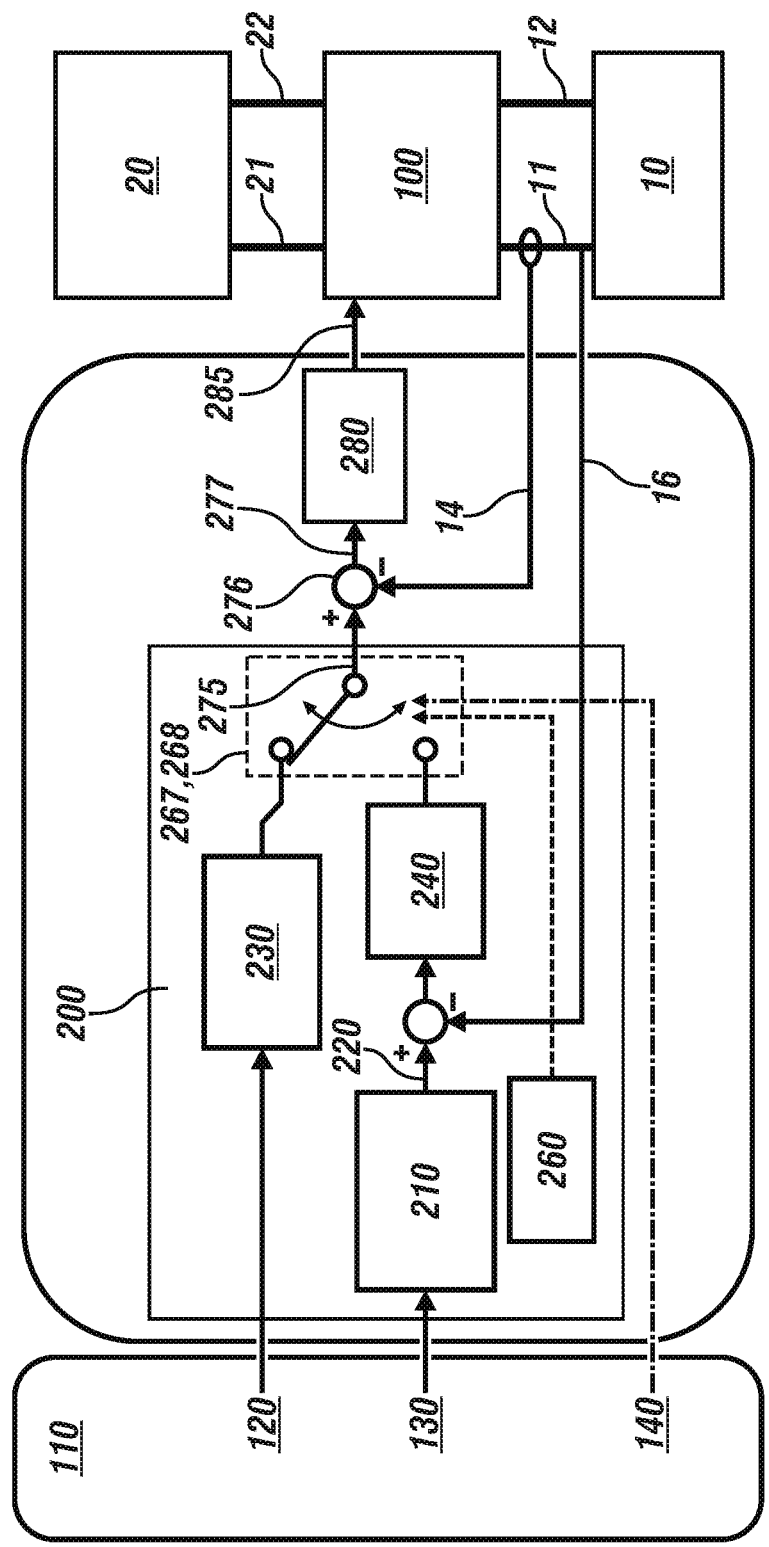
FIG. 2 schematically shows a control system to control operation of a DC-DC power converter in response to a boost input current request and limits, a boost input voltage and limits, and a boost control mode, in accordance with the disclosure.
Figure 3:
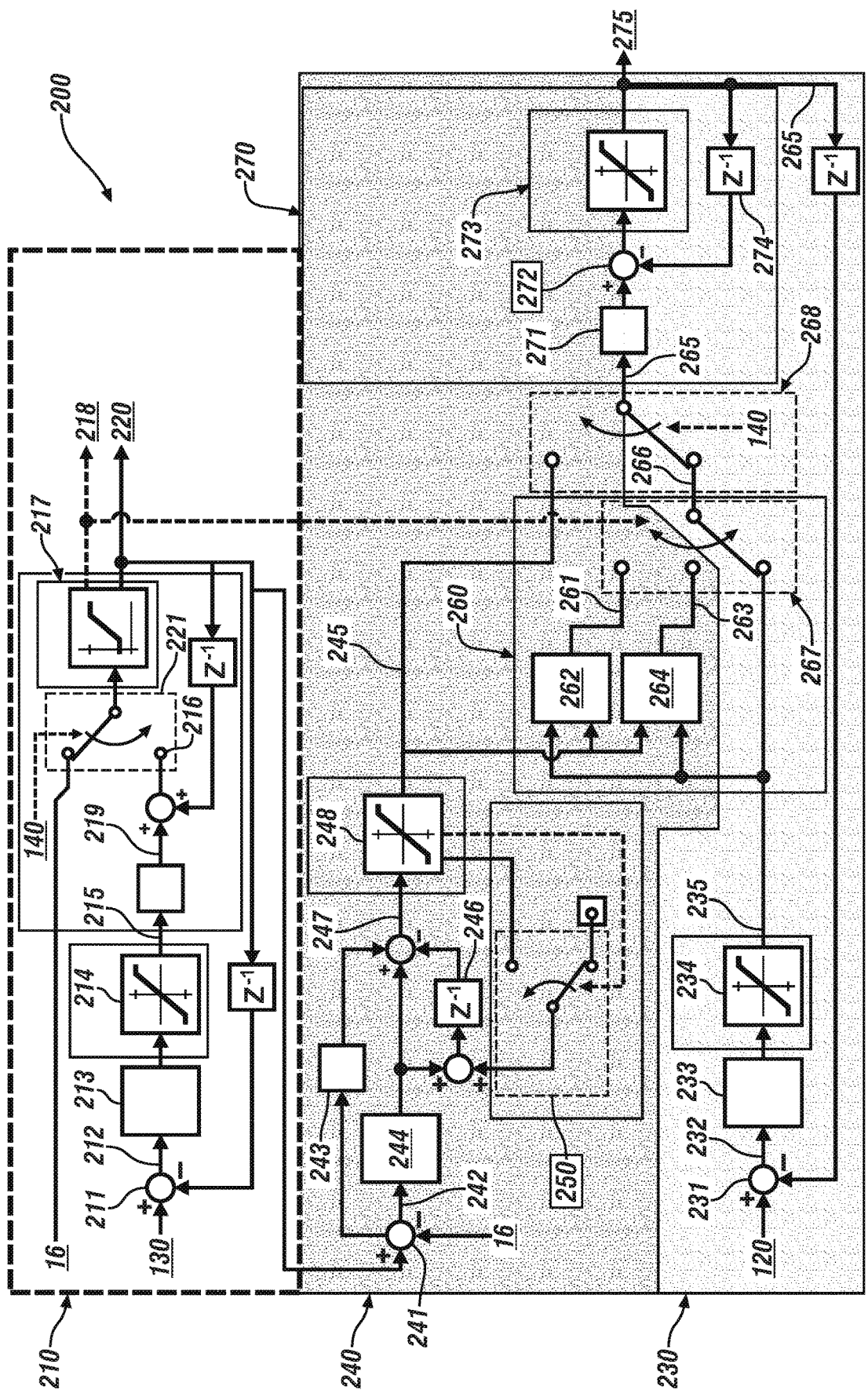
FIG. 3 schematically shows a more detailed arrangement of the control system described with reference to FIG. 2, including a current command state filter, a voltage command state filter, and a voltage regulator.

A controller 60 is arranged to monitor signal inputs from the plurality of current sensors 41, 42, 43 and command operation of the power semiconductor switches 36 of the first, second and third switched inductance circuits 31, 32, and 33 in a manner described herein with reference to FIGS. 2 and 3. The power semiconductor switches 36 may include a semiconductor device such as a metal oxide semiconductor field-effect transistor (MOSFET), installed gate, bipolar transistor (IGBT), gate turn-off thyristor (GTO), or another electronic switching device, and are controllable in conducting modes (ON) and blocking modes (OFF). The DC-DC power converter 100 as illustrated is configured as a three-phase device that employs three of the switched inductance circuits 30. However, it is appreciated that another quantity of the switched inductance circuits 30 may be employed, including, e.g., two, four, or more of the switched inductance circuits 30. Design aspects of the aforementioned inductors 34, diodes 35, power semiconductor switches 36, etc. are application-specific, and depend upon factors such as power demand, current flow, operating environment, etc.

The term "controller" and related terms such as control module, module, control, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers.

FIGS. 2 and 3, with continued reference to FIG. 1, schematically show an arrangement for a control system 200 that may be executed in the controller 60 to control operation of the DC-DC power converter 100 in response to commands 110 associated with the DC power source 10. The commands 110 associated with the DC power source 10 include a current command in the form of a boost input current request 120, a boost input voltage request 130, and a desired boost control mode 140. The desired boost control mode 140 may be either a voltage control mode or a current control mode, and describe a desired operation of the DC-DC power converter 100. The control system 200 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations.

The control system 200 includes a current command state filter 230, a voltage command state filter 210, and a voltage regulator 240, which include control operations that cooperate to generate a current command 275 for controlling operation of the DC-DC power converter 100 in response to the boost input current request 120 and the boost input voltage request 130 and states of feedback parameters. The feedback parameters are associated with DC electric power that is supplied from the DC power source 10 to the DC-DC power converter 100 via HV1+ 11 and HV1− 12, and include an input current 14 and a monitored or feedback voltage 16.

The current command state filter 230 generates a desired current-control differential current 235 based upon the boost input current request 120 and the previously determined current command 275. The desired current-control differential current 235 is also referred to herein as a second desired differential current 235. The voltage command state filter 210 and the voltage regulator 240 combine to generate a desired voltage-control differential current 245, also referred to herein as a first desired differential current 245, based upon the boost input voltage request 130 and the feedback voltage 16. One of the first desired differential current 245 or the second desired differential current 235 is selected as a desired differential current term 265 based upon the desired boost control mode 140. The desired differential current term 265 is input to a shared integrator 270, which generates the current command 275. The current command 275 is compared with the input current 14 via difference operator 276 to generate a difference current 277, which is input to a current regulator 280. The current regulator 280 generates a duty cycle command 285 that is communicated via the controller 60 to the gate driver circuit 50 of the HWIO 70 to generate PWM commands for controlling the interleaved switched inductance circuits 30 of the DC-DC power converter 100 based upon the difference current 277. Details of this arrangement and associated operation is described herein with reference to FIGS. 3-7.

FIG. 3 schematically shows a more detailed arrangement of the control system 200 including the current command state filter 230, voltage command state filter 210, and the voltage regulator 240 to generate the current command 275 for controlling operation of the DC-DC power converter 100 in response to the boost input current request 120 and the boost input voltage request 130 and states of feedback parameters.

The current command state filter 230 includes, in one embodiment, a proportional filter element that compares the boost input current request 120 with the current command 275, delayed by a cycle, via a difference operator 231 to determine a current difference term 232. The current difference term 232 is subjected to a scalar gain term 233, the resultant of which is subjected to current slew rate limits via saturation operator 234 to determine the second desired differential current 235. The second desired differential current 235 is input to a voltage limiting function 260 and to a limit voltage selector 267, as described herein.

The voltage command state filter 210 and the voltage regulator 240 combine to generate the first desired differential current 245 based upon the boost input voltage request 130 and the feedback voltage 16. The voltage command state filter 210 includes, in one embodiment, a proportional filter element that compares the boost input voltage request 130 with a voltage command 220 via a difference operator 211 to determine a voltage difference term 212, which is subjected to a scalar gain term 213, the result of which is subjected to voltage slew limits via saturation operator 214 to determine a differential voltage term 215. The differential voltage term 215 is multiplied by the sample period $T_s$ to determine the voltage difference term 219. The voltage difference term 219 is added to the previously determined voltage command 220 to determine a first voltage command 216. The first voltage command 216 and the feedback voltage 16 are provided as inputs to a selector function 221 that is controlled by the desired boost control mode 140. When the desired boost control mode 140 for operating the DC-DC power converter 100 is the voltage control mode, the first voltage command 216 is selected by the selector function 221, and is subjected to a voltage command limiting saturation function 217. The voltage command limiting saturation function 217 determines an updated value for the voltage command 220 based upon the first voltage command 216, and also provides a saturation status 218. The saturation status 218 indicates whether the voltage command 220 is within a linear range, or has saturated, i.e., has reached an upper voltage limit or a lower voltage limit. When the desired boost control mode 140 for operating the DC-DC power converter 100 is the current control mode, the feedback voltage 16 is selected by the selector function 221, and is subjected to the voltage command limiting saturation function 217. The voltage command limiting saturation function 217 determines an updated value for the voltage command 220 based upon the feedback voltage 16, and also provides the saturation status 218. The saturation status 218 indicates whether the voltage command 220 is within a linear range, or has reached and been limited to an upper voltage limit or a lower voltage limit.

The voltage command 220 is communicated to the voltage regulator 240. The voltage regulator 240 includes, in one embodiment, a proportional-integral regulator that compares the voltage command 220 with the feedback voltage 16 via a difference operator 241 to determine a voltage error term 242, which is subjected to a scalar integral error gain term 243, an proportional error gain term 244, and a backshift operator 246 for subtraction the value due to the previous proportional error gain term operation, all to determine an initial desired differential current 247. The initial desired differential current 247 is subjected to a saturation function 248 to determine the first desired differential current 245. This includes the value due to the previous proportional error gain term operation being modified before the backshift operator 246 by adding the applied slew limit by an anti-windup routine 250 when the initial differential current 247 saturates at either a minimum or a maximum value in order to control the desired differential current when the initial desired differential current 247 approaches a saturation limit. Thus, the voltage regulator 240 employs an anti-windup technique to maintain proportional error gain linearity when using the current slew limiting capability of the regulator in the form of the saturation function 248.

The first desired differential current 245 is provided as input to a selector function 268, and also as an input to a voltage limiting function 260. The other input to the voltage limiting function 260 is the second desired differential current 235 that is generated by the current command state filter 230. The voltage limiting function 260 provides a max/min function, wherein a max comparator 262 selects a maximum value of the second desired differential current 235 and the first desired differential current 245 as a differential current for use at an upper voltage limit differential current 261, and a minimum comparator 264 and also selects a minimum value of the desired current-control differential current 235 and the first desired differential current 245 as a differential current for use at a lower voltage differential current 263. The limit voltage selector 267 selects one of the upper voltage limit differential current 261, the lower voltage limit differential current 263 or the second desired differential current 235 as the initial differential current 266 based upon the saturation status 218 of the voltage command state filter 210. The initial differential current 266 is also referred to herein as a "second desired differential current 266".

Selector 268 selects one of the second desired differential current 266 or the first desired differential current 245 as the desired differential current term 265 based upon the desired boost control mode 140. This includes selecting the second desired differential current 266 when the desired boost control mode 140 is the current control mode, and selecting the first desired differential current 245 when the desired boost control mode 140 is the voltage control mode.

The desired differential current term 265 is input to a shared integrator 270, which generates the current command 275. The shared integrator 270 transforms the desired differential current term 265 to a difference term 271, which is added via an adder function 272 to the current command 275 that was determined during a previous iteration 274, and subjected to a saturation function 273 to determine an updated value for the current command 275. This configuration facilitates combining the current command state filter 230, with slew limiting and low pass filter capabilities, and the voltage regulator 240, including sharing of the integrator 270. Voltage limiting may be accomplished by selecting the input 265 to the integrator 270 by maximum slew rate of current when at the upper voltage limit and the minimum slew rate of current when at the lower voltage limit.

This configuration facilitates resetting the voltage state filter integrator to the feedback voltage when operating in a current control mode and using the limiting of that integrator to initiate automatic voltage limiting. This configuration controls the current and voltage of DC-DC boost converters by generating a current command and use of a current regulator, where transitioning between the current control mode and the voltage control mode is accomplished by input or automatic action when operating in voltage or current limit conditions with one or more of the following features, including an integrator 270 that is shared between the current command state filter 230 (optionally with slew limiting and low pass filter capabilities) and the voltage regulator 240. The integrator 270 is last in the structure and its input is selected depending on the mode being either voltage control or current control. In the current control mode the integrator input is selected by taking the maximum slew rate of current when at the upper voltage limit and the minimum slew rate of current when at the lower voltage limit. In one embodiment, the voltage regulator 240 includes the anti-windup function 250 by subtracting the slew rate limit value from the proportional error term to maintain proportional error gain linearity when the current command is slew rated limited by the voltage regulator. In one embodiment, the voltage state filter integrator limiting initiates automatic voltage limiting action in the voltage regulator 240 and the current command state filter 230.

Figure 4:
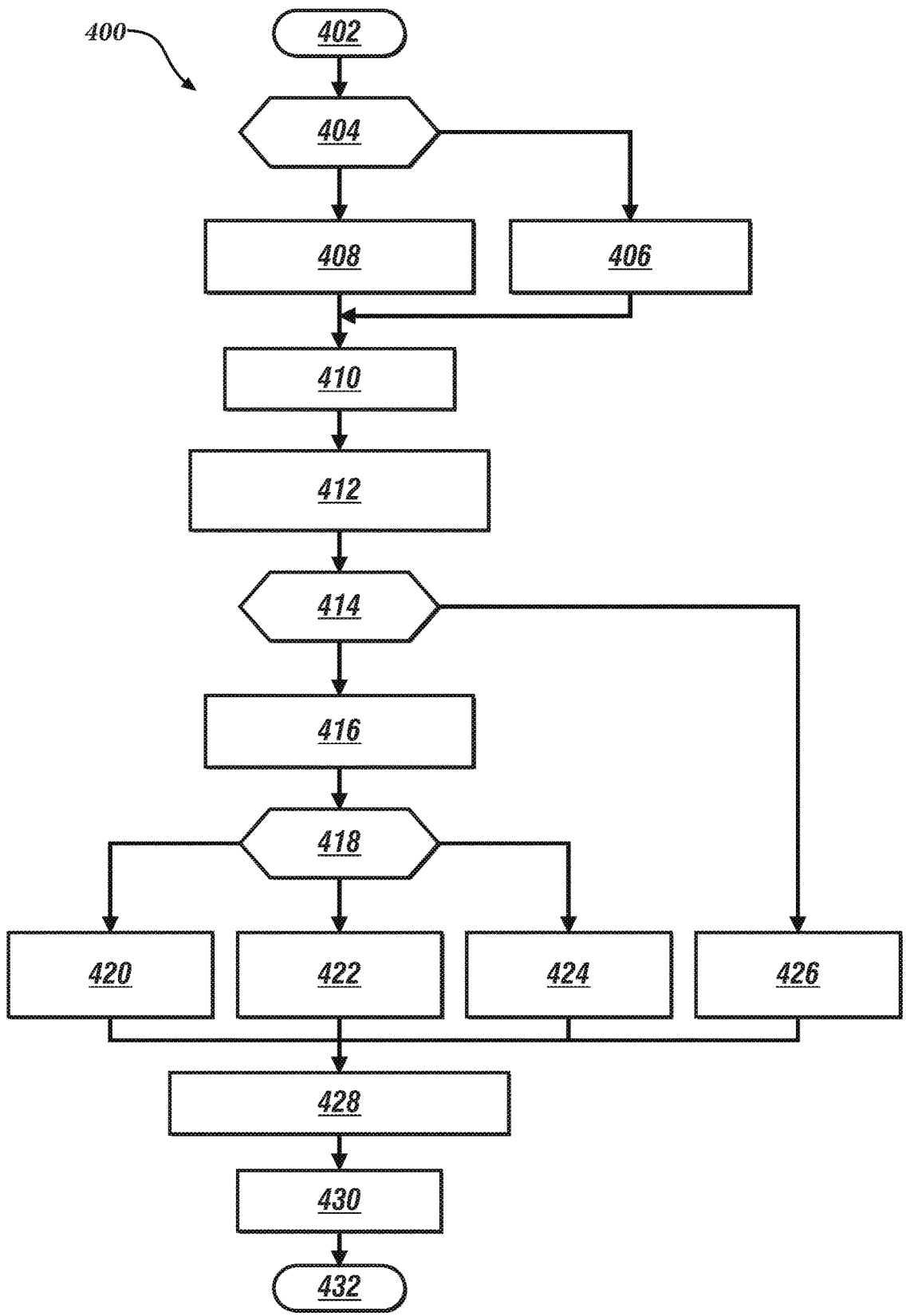
FIG. 4 schematically shows a flowchart associated with controlling operation of the control system described with reference to FIG. 2 and FIG. 3, in accordance with the disclosure.

FIG. 4 schematically shows a routine 400 for controlling operation of an embodiment of the DC-DC power converter 100 described with reference to FIG. 1, to conduct electric power from the DC power source 10 to the high-voltage electrical bus 20, employing the control system 200 that is described with reference to FIGS. 2 and 3. Table 1 is provided as a key wherein the numerically labeled blocks and the corresponding functions are set forth as follows, corresponding to the routine 400. The teachings may be described herein in terms of functional and/or logical block components and/or various processing steps. It should be realized that such block components may be composed of hardware, software, and/or firmware components that have been configured to perform the specified functions.

TABLE 1

| BLOCK | BLOCK CONTENTS |
|---|---|
| 402 | Initiate operation |
| 404 | Determine a desired control mode for operating the DC-DC power converter - one of a voltage control mode and a current control mode |
| 406 | Voltage control mode - execute voltage command state filter to determine voltage command |
| 408 | Current control mode - set desired voltage equal to feedback voltage |
| 410 | Determine if desired voltage has reached a saturation limit and limit if needed |
| 412 | Execute voltage regulator to determine a first desired differential current |
| 414 | Determine the desired control mode |
| 416 | Execute current command state filter to determine a second desired differential current |
| 418 | Is voltage level at a saturation limit? |
| 420 | Use the second desired differential current when the voltage level is not saturated |
| 422 | Use a maximum of the first desired differential current and the second desired differential current when the voltage level is saturated at a maximum |
| 424 | Use a minimum of the first desired differential current and the second desired differential current when the voltage level is saturated at a minimum |
| 426 | Select the first desired differential current when the voltage control mode is determined |
| 428 | Determine next current command from previous current command and the selected desired differential current |
| 430 | Limit current based upon minimum, maximum current limits |
| 432 | Implement control based upon current |

Execution of the routine 400 may proceed as follows, and is described with reference to the system of FIG. 3. The steps of the routine 400 may be executed in a suitable order, and are not limited to the order described with reference to FIG. 4. The routine 400 periodically executes (402), and includes determining a desired control mode for operating the DC-DC power converter, wherein the desired control mode includes one of a voltage control mode and a current control mode (404). This includes determining a desired voltage for operating the DC-DC power converter based upon the desired control mode.

When the voltage control mode is selected, a portion of the voltage command state filter 210 is executed to determine the voltage command 220 based upon the boost input voltage request 130, including executing steps 211, 212, 213, 214, 215, 219, 216 and 217 (406). When the current control mode is selected, the voltage command 220 is determined based upon the feedback voltage 16 (408). The desired voltage is evaluated to determine if it has reached a saturation limit via the voltage command limiting saturation function 217 (410). The voltage regulator is executed to determine the first desired differential current 245 (412), and the desired control mode is employed to determine the next step (414). When the voltage control mode is requested, the first desired differential current 245 is selected (426), and provided as an input to the shared integrator 270 (428). When the current control mode is requested, the current command state filter 230 is executed to determine a second desired differential current based upon a difference between the desired current and a monitored current (416). This includes integrating the second desired differential current 235 to determine the desired current when the desired control mode is the current control mode and when the desired voltage has not reached either a maximum saturation limit or a minimum saturation limit (420)(428). This includes determining a first desired differential current based upon a difference between the desired voltage and the monitored voltage, selecting a maximum of the first desired differential current and the second desired differential current and integrating the maximum of the first and second differential currents to determine the desired current when the desired control mode includes the current control mode and when the desired voltage has reached the maximum saturation limit (422)(428). This includes determining a first desired differential current based upon a difference between the desired voltage and a monitored voltage, selecting a minimum of the first desired differential current and the second desired differential current, and integrating the minimum of the first and second desired differential currents to determine the desired current when the desired control mode is the current control mode and when the desired voltage has reached the minimum saturation limit (424)(428). The final current is limited to minimum or maximum current limits (430), and operation of the DC-DC power converter is controlled in the desired control mode based upon the desired voltage and the desired current (432).

Figure 5:
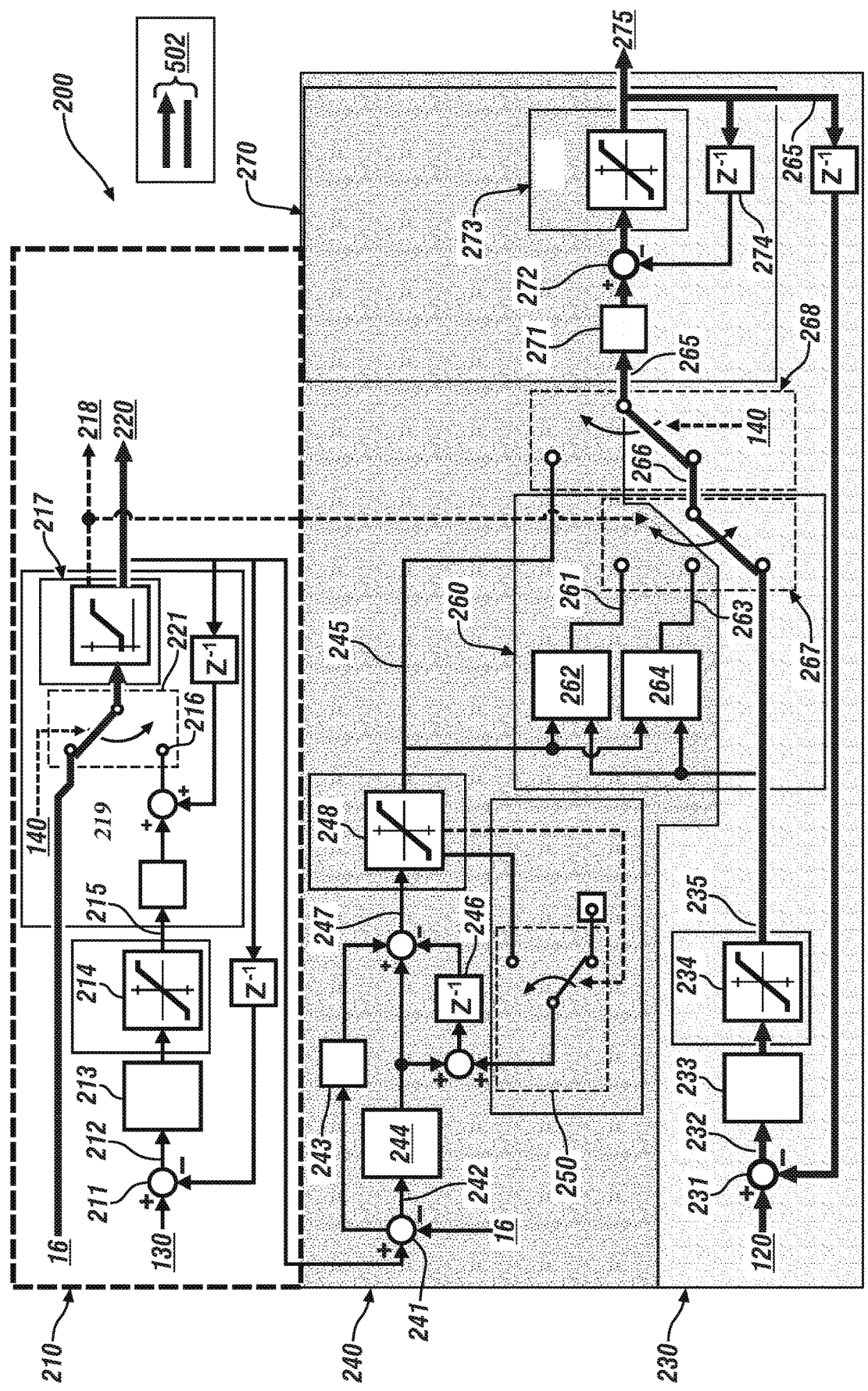
FIG. 5 schematically shows one aspect of operating the control system described with reference to FIGS. 2 and 3 when a current control mode has been requested, in accordance with the disclosure.

FIG. 5 schematically shows the detailed arrangement of the control system 200 including the current command state filter 230, voltage command state filter 210, and the voltage regulator 240 to generate the current command 275 for controlling operation of the DC-DC power converter 100 as described with reference to FIG. 3, and depicts operation of the control system 200 when the current control mode is requested. In this depiction, the desired boost control mode 140 selects the current control mode via selector 221 and selector 268, with selector 267 indicating that the voltage level is not presently limited as indicated by the saturation status 218, which indicates the voltage command 220 is within a linear range. The current command 275 is determined based upon operation of the current command state filter 230. This signal process is indicated by line 502.

Figure 6:
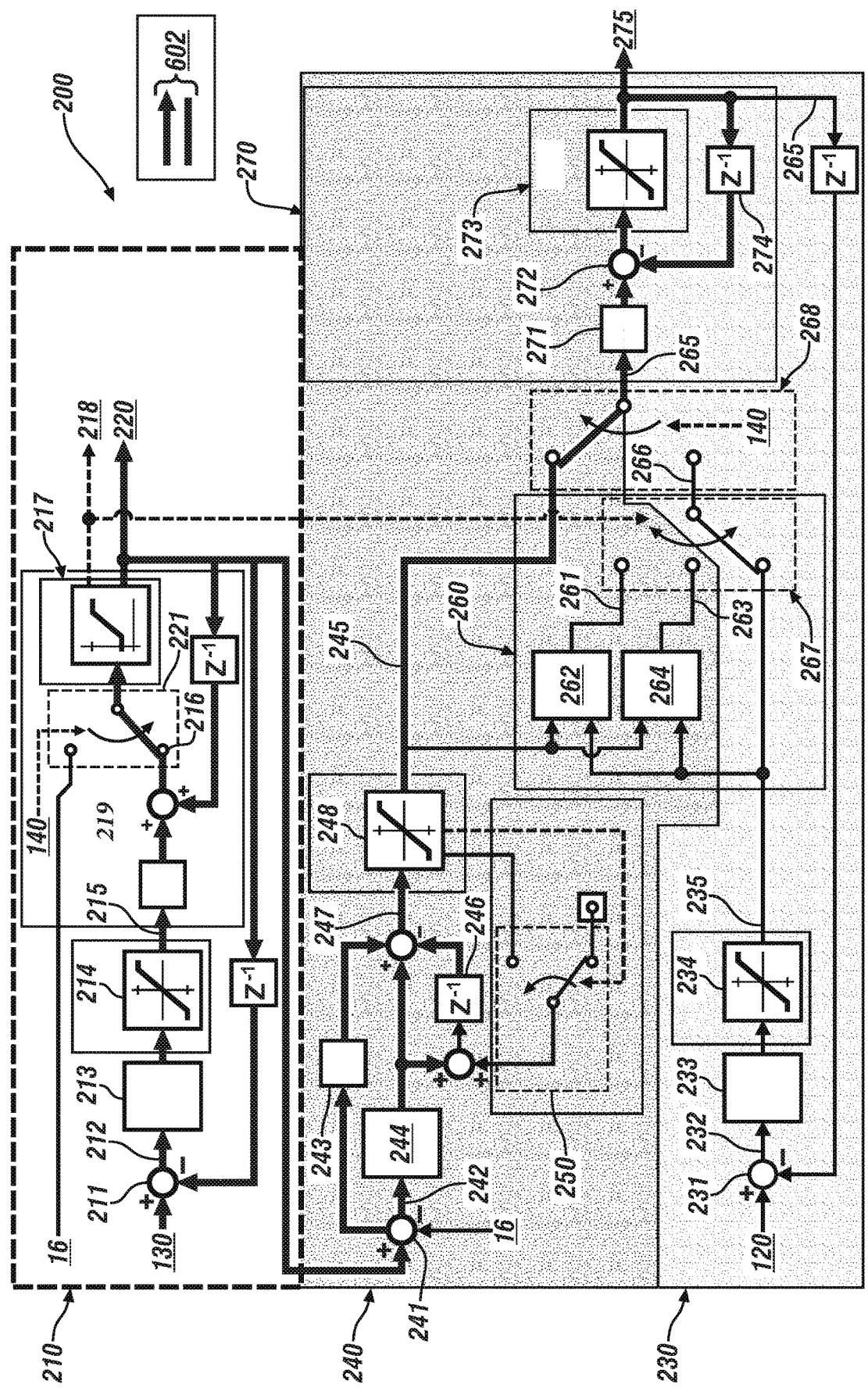
FIG. 6 schematically shows one aspect of operating the control system described with reference to FIGS. 2 and 3 when a voltage control mode has been requested, in accordance with the disclosure.

FIG. 6 schematically shows the detailed arrangement of the control system 200 including the current command state filter 230, voltage command state filter 210, and the voltage regulator 240 to generate the current command 275 for controlling operation of the DC-DC power converter 100 as described with reference to FIG. 3, and depicts operation of the control system 200 when the voltage control mode is requested. In this depiction, the desired boost control mode 140 selects the voltage control mode via selector 221 and selector 268, with selector 267 indicating that the voltage level is not presently limited as indicated by the saturation status 218, which indicates the voltage command 220 is within a linear range. It is appreciated that selector 267 may be set to any of three inputs (voltage not limited, at upper limit, or at lower limit) and the voltage control behavior is the same, since selector 268 is set to take 245 as input to 270. The current command 275 is determined based upon operation of the voltage command state filter 210 in conjunction with voltage regulator 240. This signal process is indicated by line 602.

Figure 7:
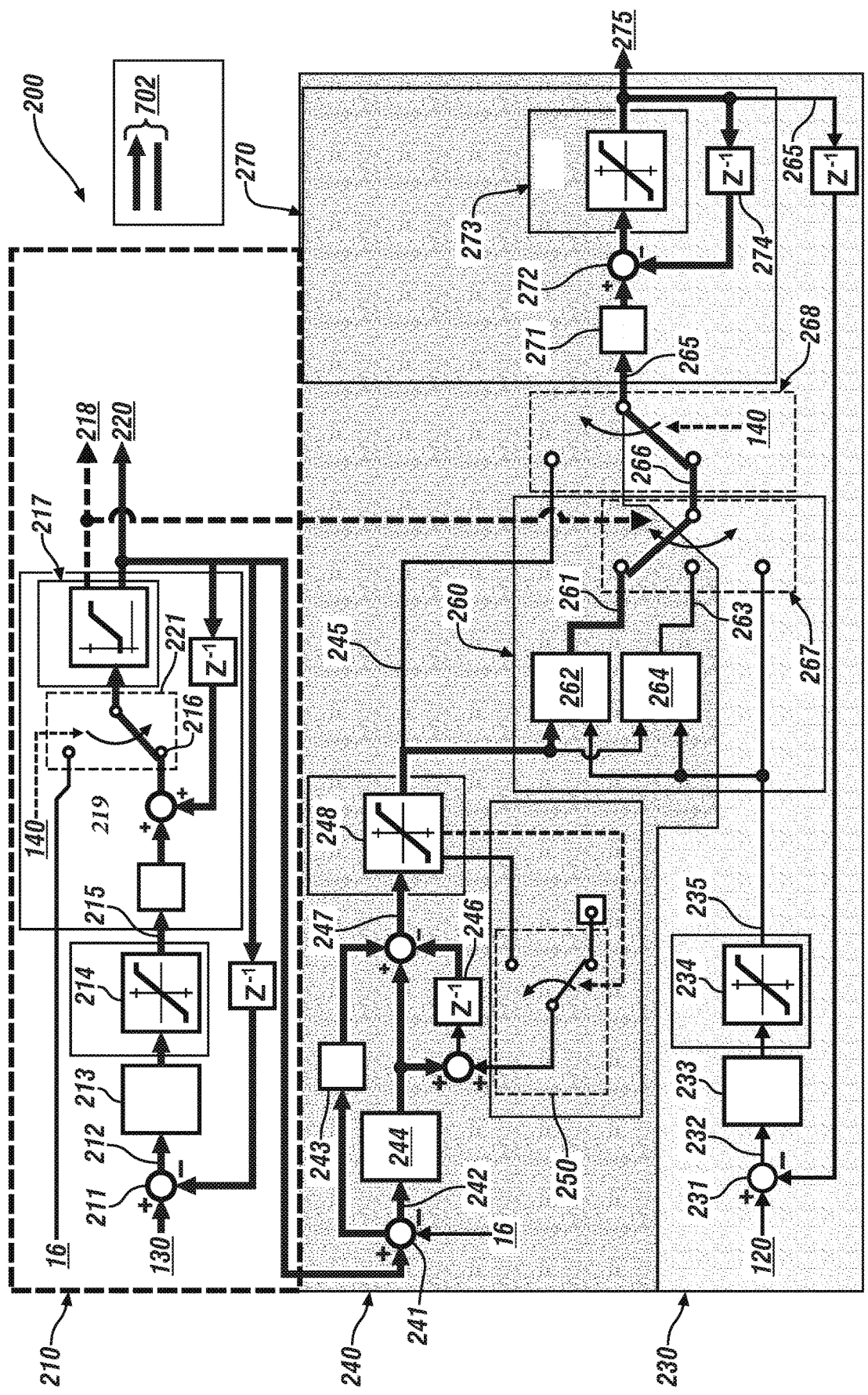
FIG. 7 schematically shows one aspect of operating the control system described with reference to FIGS. 2 and 3 when a current control mode has been requested at an upper voltage limit, in accordance with the disclosure.

FIG. 7 schematically shows the detailed arrangement of the control system 200 including the current command state filter 230, voltage command state filter 210, and the voltage regulator 240 to generate the current command 275 for controlling operation of the DC-DC power converter 100 as described with reference to FIG. 3, and depicts operation of the control system 200 when the current control mode is requested, but the voltage level has reached an upper voltage limit. In this depiction, the desired boost control mode 140 selects the current control mode via selector 221 and selector 268, with selector 267 indicating that the voltage level is presently limited at an upper limit as indicated by the saturation status 218, which indicates the voltage command 220 is outside of a linear range. The current command 275 is determined based upon operation of the voltage command state filter 210 in conjunction with voltage regulator 240, with the voltage limiting function 260 including the max comparator 262 that selects a maximum value of the second desired differential current 235 and the first desired differential current 245 as the upper voltage limit differential current 261, which is used to generate the current command 275. This signal process is indicated by line 702.

The concepts described herein provide a method of control of a DC-DC boost converter for operation in a current control mode or operation in a voltage control mode, and dynamically transitioning between the modes during operation.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for controlling a DC-DC power converter arranged to supply electric power originating from a DC power source to a high-voltage bus, the method comprising:
   determining a desired control mode for operating the DC-DC power converter, wherein the desired control mode comprises one of a voltage control mode and a current control mode;
   determining a desired voltage for operating the DC-DC power converter based upon the desired control mode;
   determining a desired differential current for operating the DC-DC power converter based upon the desired control mode;
   determining a desired current for operating the DC-DC power converter based upon the desired differential current and the desired voltage; and
   controlling operation of the DC-DC power converter in the desired control mode based upon the desired voltage and the desired current.

2. The method of claim 1, wherein determining the desired voltage for operating the DC-DC power converter based upon the desired control mode comprises setting the desired voltage equal to a feedback voltage when the desired control mode is the current control mode.

3. The method of claim 1, wherein determining the desired voltage for operating the DC-DC power converter based upon the desired control mode comprises executing a voltage command state filter to determine the desired voltage when the desired control mode is the voltage control mode.

4. The method of claim 1, wherein the desired voltage is subjected to a minimum saturation limit and a maximum saturation limit.

5. The method of claim 1, wherein determining the desired differential current for operating the DC-DC power converter based upon the desired control mode comprises determining a first desired differential current based upon a difference between the desired voltage and a feedback voltage when the desired control mode is the voltage control mode.

6. The method of claim 5, further comprising executing an anti-windup function to control the first desired differential current when the first desired differential current exceeds a saturation limit.

7. The method of claim 5, further comprising integrating the first desired differential current to determine the desired current when the desired control mode comprises the voltage control mode.

8. The method of claim 1, wherein determining the desired differential current for operating the DC-DC power converter based upon the desired control mode comprises determining a second desired differential current based upon a difference between a previously determined desired current and a current request when the desired control mode is the current control mode.

9. The method of claim 8, further comprising integrating the second desired differential current to determine the desired current when the desired control mode comprises the current control mode and when the desired voltage has not reached either a maximum saturation limit or a minimum saturation limit.

10. The method of claim 8, further comprising:
   determining a first desired differential current based upon a difference between the desired voltage and a monitored voltage;
   selecting a maximum of the first desired differential current and the second desired differential current; and
   integrating the maximum of the first and second desired differential currents to determine the desired current when the desired control mode comprises the current control mode and when the desired voltage has reached the maximum saturation limit.

11. The method of claim 8, further comprising:
   determining a first desired differential current based upon a difference between the desired voltage and a monitored voltage;
   selecting a minimum of the first desired differential current and the second desired differential current; and
   integrating the minimum of the first and second desired differential currents to determine the desired current when the desired control mode comprises the current control mode and when the desired voltage has reached the minimum saturation limit.

12. A DC-DC power converter arranged to supply electric power originating from a DC power source to a high-voltage bus, comprising:

a plurality of interleaved switched inductance circuits, a bulk capacitor, and a HWIO ("hardware input/output") circuit including a gate driver circuit and an electrical interface circuit;

wherein each of the interleaved switched inductance circuits includes an inductor, a diode and a power semiconductor switch, and a current sensor;

wherein the DC-DC power converter is operated at a fixed frequency with a preset cycle time;

wherein the plurality of switched inductance circuits are operated with offsets in phase during each cycle period; and a controller, in communication with the HWIO circuit, the controller including a memory device including an instruction set, the instruction set executable to:

determine a desired control mode for operating the DC-DC power converter, wherein the desired control mode comprises one of a voltage control mode and a current control mode;

determine a desired voltage for operating the DC-DC power converter based upon the desired control mode;

determine a desired differential current for operating the DC-DC power converter based upon the desired control mode;

determine a desired current for operating the DC-DC power converter based upon the desired differential current and the desired voltage; and control operation of the DC-DC power converter in the desired control mode based upon the desired voltage and the desired current.

13. The DC-DC power converter of claim 12, wherein the instruction set executable to determine the desired voltage for operating the DC-DC power converter based upon the desired control mode comprises the instruction set executable to set the desired voltage equal to a feedback voltage when the desired control mode is the current control mode.

14. The DC-DC power converter of claim 12, wherein the instruction set executable to determine the desired voltage for operating the DC-DC power converter based upon the desired control mode comprises the instruction set executable to execute a voltage command state filter to determine the desired voltage when the desired control mode is the voltage control mode.

15. The DC-DC power converter of claim 12, wherein the desired voltage is subjected to a minimum saturation limit and a maximum saturation limit.

16. The DC-DC power converter of claim 12, wherein the instruction set executable to determine the desired differential current for operating the DC-DC power converter based upon the desired control mode comprises the instruction set executable to determine a first desired differential current based upon a difference between the desired voltage and a feedback voltage when the desired control mode is the voltage control mode.

17. The DC-DC power converter of claim 16, further comprising the instruction set executable to execute an anti-windup function to control the first desired differential current when the first desired differential current exceeds a saturation limit.

18. The DC-DC power converter of claim 16, further comprising the instruction set executable to integrate the first desired differential current to determine the desired current when the desired control mode comprises the voltage control mode.

19. The DC-DC power converter of claim 12, wherein the instruction set executable to determine a desired differential current for operating the DC-DC power converter based upon the desired control mode comprises the instruction set executable to determine a second desired differential current based upon a difference between a previously determined desired current and a current request when the desired control mode is the current control mode.

20. The DC-DC power converter of claim 19, further comprising the instruction set executable to integrate the second desired differential current to determine the desired current when the desired control mode comprises the current control mode and when the desired voltage has not reached either a maximum saturation limit or a minimum saturation limit.

* * * * *